(12) United States Patent  (10) Patent No.: US 8,612,720 B2
Sim  (45) Date of Patent: Dec. 17, 2013

(54) SYSTEM AND METHOD FOR IMPLEMENTING DATA BREAKPOINTS

(75) Inventor: Alvin Sim, Ottawa (CA)

(73) Assignee: Edgewater Computer Systems, Inc. (CA)

( * ) Notice: Subject to any disclaimer, the term of this patent is extended or adjusted under 35 U.S.C. 154(b) by 169 days.

(21) Appl. No.: 11/673,436

(22) Filed: Feb. 9, 2007

(65) Prior Publication Data

US 2008/0196013 A1  Aug. 14, 2008

(51) Int. Cl.
*G06F 12/00*  (2006.01)

(52) U.S. Cl.
USPC ............... 711/206; 711/207; 711/E12.061; 711/E12.058

(58) Field of Classification Search
None
See application file for complete search history.

(56) References Cited

U.S. PATENT DOCUMENTS

| | | | |
|---|---|---|---|
| 5,274,789 A * | 12/1993 | Costa et al. | 711/206 |
| 5,530,804 A * | 6/1996 | Edgington et al. | 714/30 |
| 6,523,104 B2 * | 2/2003 | Kissell | 711/206 |
| 2003/0084375 A1 | 5/2003 | Moore et al. | 714/34 |
| 2004/0083458 A1 * | 4/2004 | Gschwind et al. | 717/129 |
| 2004/0193831 A1 * | 9/2004 | Moyer | 711/202 |

* cited by examiner

*Primary Examiner* — Reginald Bragdon
*Assistant Examiner* — Thanh D Vo
(74) *Attorney, Agent, or Firm* — Hayes Soloway P.C.

(57) ABSTRACT

A system and method for implementation of MMU assisted data breakpoints for any number of data structures within a program application are provided. For each data structure for which a data breakpoint is desired, two distinct MMU entries are created. One MMU entry has access attributes. The other entry has an interrupt triggering sub-entry. According to the preferred embodiment, access to the second MMU entry causes a page fault.

21 Claims, 2 Drawing Sheets

SYSTEM AND METHOD FOR IMPLEMENTING DATA BREAKPOINTS

STATEMENT REGARDING FEDERALLY SPONSORED RESEARCH OR DEVELOPMENT

This invention was made with Government support under Contract FA8626-06-D-2083 awarded by the United States Air Force. The Government has certain rights in the invention.

BACKGROUND OF THE INVENTION

The activity of debugging data processing systems is akin to diagnosing problems in such systems. A first class of debugging tools primarily help diagnose bugs by allowing the computer programmer to halt the execution of a sequence of instructions on a central processing unit (CPU). This debugging technique is commonly known as 'setting an instruction breakpoint'. It relies on support in the CPU and is generally available on modern processors.

Another type of debugging facility supported by modern processors is the ability to 'set a hardware data breakpoint'. In such a debugging technique, access to a memory location is detected. Setting hardware data breakpoints is available in some modern processors and the technique also requires support by the CPU. More specifically, in this case, the CPU monitors all accesses to memory and compares them to desired data breakpoint locations kept in debug address registers. When there is a match, the CPU halts, allowing the computer programmer to inspect the state of the machine. In using this technique, there is a limitation to the number of memory locations that can be monitored simultaneously. For example, in the Intel Pentium 4 processor, only four 32 bit sized locations can be monitored simultaneously.

$3^{rd}$ generation language constructs such as 'C', Java, and 'C++' constructs are translated into a combination of instruction sequences and data structures. Debugging the output of these languages relies primarily on verifying the correct sequence of instruction is executed. Instruction breakpoints aid in this process by stopping the CPU at designated points in the control flow sequence. Data breakpoints are less frequently used, but are useful as well to detect reads and writes to data structures. Whereas there is no limit to the number of instruction breakpoints that can be set, there is only a limited number of data breakpoints that can be set on modern CPUs.

Unlike $3^{rd}$ generation language constructs, some state-machines and language constructs have their control flow translated only into data structures, rather than into instruction sequences. As an example, RTExec, part of the RTEdge platform, is a toolset used in describing such state-machines or language constructs. Instruction breakpoints are not as useful for debugging such language constructs since there is no instruction sequence to interrupt. Setting data breakpoints is therefore more important for debugging these language constructs. Efficient methods and systems of setting data breakpoint are desired.

SUMMARY OF THE INVENTION

An object of the invention is to provide a data processing system allowing for memory management unit (MMU) assisted data breakpoints implementation. Essentially, the data processing system comprises a main application unit having a data structure for which a data breakpoint is desired, a memory management unit (MMU) and a system for implementing a data breakpoint for the data structure. The system for implementing a data breakpoint for the data structure creates two MMU entries associated with the data structure. The first MMU entry has access attributes. The second MMU entry has an interrupt triggering sub-entry. According to the preferred embodiment, pointers are used to reference data structures within the main application and the first and second MMU entries corresponding to the data structure for which a data breakpoint is desired are accessed via pointers differing in their most significant bit.

Another object of the invention is to provide a method for implementing a data breakpoint for a given data structure of a main application within a data processing system, where the data processing system has a memory management unit MMU. The method comprises the steps of creating a first MMU entry associating access attributes with the data structure and the step of creating a second MMU entry associating an interrupt triggering sub-entry with said data structure. In a debugging mode of operation, the method may further comprise the steps of executing an instruction in the main application unit containing the data structure, accessing the data structure through the second MMU entry for interrupting the main application and passing control to a debugger to allow for debugging operations. After debugging operations, normal execution of the main application usually resumes.

Yet another object of the invention is to provide a computer system allowing for provisioning of data breakpoints corresponding to data structures within a main application running on the computer system.

The invention overcomes limitations of the prior art systems by allowing for a greater number of data breakpoints to be set. According to the preferred embodiment, the granularity of the data breakpoint can be reduced from a page to that of a data structure. Furthermore, the invention provides improved performance, by minimizing the number of undesired page faults generated. Essentially, the invention provides implementation of MMU assisted data breakpoints for any number of data structures within a program application.

BRIEF DESCRIPTION OF DRAWINGS

The following detailed description, given by way of example and not intended to limit the present invention solely thereto, will best be appreciated in conjunction with the accompanying drawings, wherein like reference numerals denote like elements and parts, where.

DETAILED DESCRIPTION OF THE INVENTION

Figure 1:
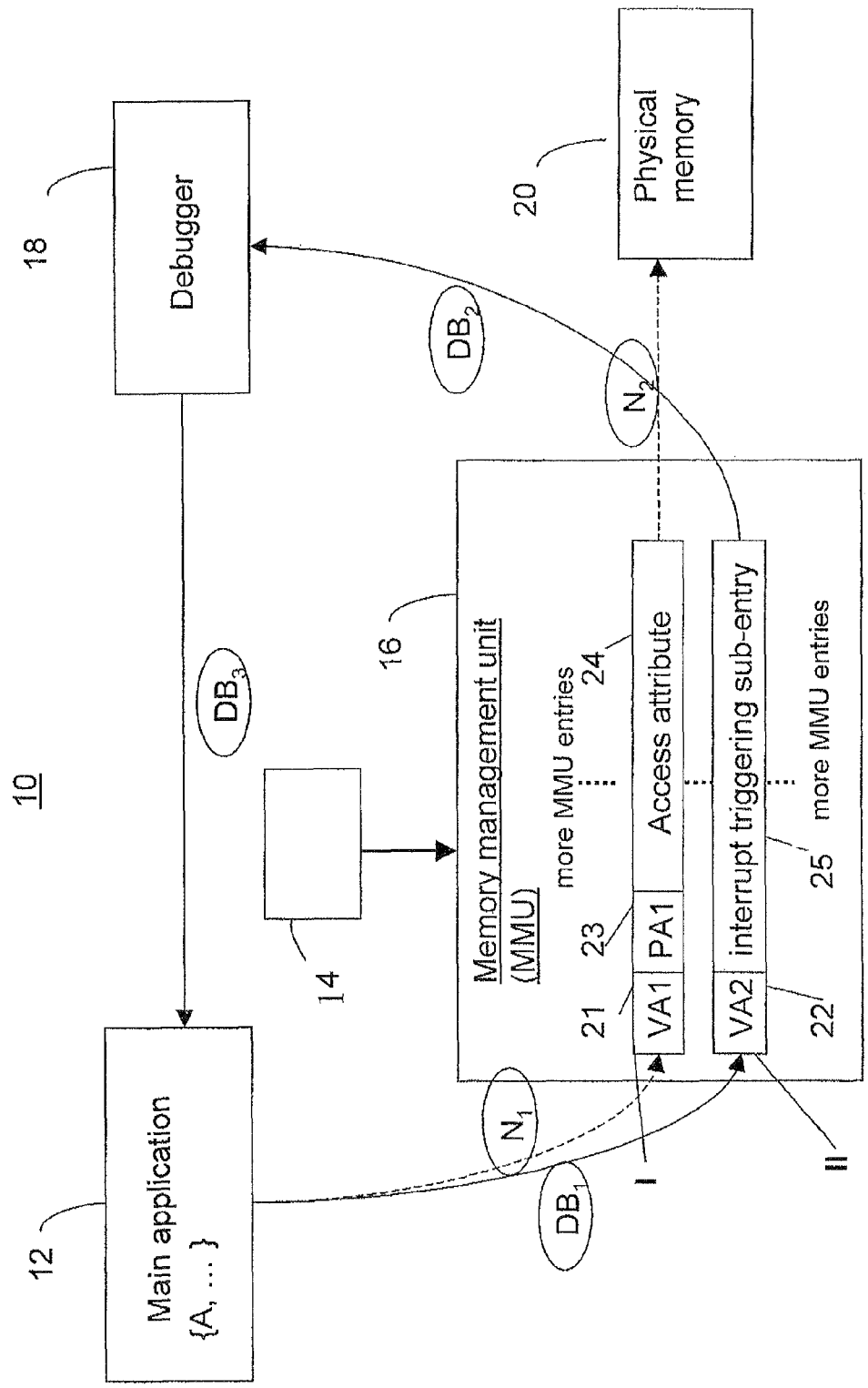
FIG. 1 illustrates a block diagram of a data processing system enabling data breakpoints provisioning in accordance with an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Prior art solutions provide general methods and systems for setting data breakpoints. Some of these, such as for example, U.S. Patent Application 2003/0084375 A1, entitled "Computer System with Watchpoint Support", to Moore and Bhattacharya, which is incorporated herein by reference, rely on paging mechanisms associated with the system memory. Paging mechanisms arise in the context of memory management.

A memory management unit (MMU) is a class of computer hardware components responsible for handling memory accesses requested by the CPU. Most program applications on a computer system access their various data structures using virtual memory. The primary function of a memory management unit (MMU) is the translation of virtual addresses to physical addresses (i.e., virtual memory management). In that respect, the MMU can be regarded as a memory management device acting as a big translation table and configured by creating translation entries. As it will be recognized by someone skilled in the art, creation of translation entries is directed from a higher architectural layer.

Modern MMU's are sometimes called paged memory management units (PMMU) since they manage physical memory in discrete memory ranges called pages. In such cases, each MMU entry corresponds to a page and describes the virtual address range, the corresponding physical address range, and various attributes associated with the entry. Most modern MMU's have attributes that can stipulate that addresses within the virtual address range be read-only, write-only, read/write, or no-access.

Typically, an MMU may trigger an interrupt in the execution by the processor of a program application in the event that a) no translation is available for a virtual address that is being accessed and/or b) a translation entry comprises an attribute causing an exception. When the execution of the program application is interrupted, the processor saves its current state, and may invoke a program to handle the condition, for example a debugging application.

Moore and Bhattacharya disclose watchpoint support by changing an MMU entry's attribute for a desired watchpoint address location so that a page fault occurs when that address location is accessed by the CPU. In this approach, the granularity of the watchpoint or data breakpoint is limited to the size of a page. However, in modern data processing systems, the minimum size of a page is typically 4 Kbytes whereas data structures are orders of magnitude smaller than the minimum page size, such as 32 bits. Using the Moore and Bhattacharya approach allows for many undesired page faults to be generated, thus causing performance deterioration.

The invention overcomes limitations of the prior art systems by allowing for a greater number of data breakpoints to be set. According to the preferred embodiment, the granularity of the data breakpoint can be reduced from a page to that of a data structure. Furthermore, the invention provides improved performance, by minimizing the number of undesired page faults generated. Essentially, the invention provides implementation of MMU assisted data breakpoints for any number of data structures within a program application. For each data structure for which a data breakpoint is desired, two distinct MMU entries are created. One MMU entry has access attributes. The other entry has an interrupt triggering sub-entry. According to the preferred embodiment, access to the second MMU entry causes a page fault.

Embodiments according to the invention can be implemented directly within a hardware layer, within single higher architectural layers such as an Operating System or within a combination of architectural layers.

Referring now to FIG. 1, a data processing system 10 according to an embodiment of the invention is illustrated. The data processing system may be a computer system. The data processing system 10, comprises a main application unit 12 having a number of data structures, including at least data structure A. In the drawing, the list of data structures including data structure A is represented as {A, . . . , . . . }. The data processing system 10 further comprises a memory management unit (MMU) 14 and a system for implementing data breakpoints 16. When a data breakpoint is desired for data structure A, the system for implementing data breakpoints 16 creates two MMU entries associated with data structure A within the MMU, a first MMU entry I and a second MMU entry II. The first MMU entry I has access attributes 24 and the second MMU entry II has an interrupt triggering sub-entry 25.

The main application unit 12 may represent any functional equivalent to a language construct as obvious to someone skilled in the art, comprising one or more steps, each based on one or more data structures. The MMU 14 represent circuitry fulfilling the translation functions between virtual addresses and physical addresses, as previously described. Given the flexibility of implementing functions at various architectural layers within a computer system, the system for implementing data breakpoints 16 can be best defined by its function of creating MMU entries corresponding to data structures within the main application unit 12.

Examples of access attributes 24 are read-only, write-only or read/write. Examples of an interrupt triggering sub-entry 25 are a non-available physical address PA2 or an attribute causing an exception, such as no-access or protected.

According to an exemplary embodiment, the first MMU entry I also has a virtual address VA1 21, and a corresponding first physical address PA1 23, while the second MMU entry II further comprises a second virtual address VA2 22, the first and second virtual addresses, VA1 21 and VA2 22 being distinct from one another. Preferably, the difference distinguishing the two virtual addresses is pre-determined. Advantageously, this facilitates switching between the two addresses, in switching from normal operation to a debug mode. A deterministic function can be used to set the difference between the two virtual addresses. For example, a difference in terms of pre-selected bits, such a number as the most significant bits, can be used. According to the preferred embodiment, the two addresses differ in the most significant bit, i.e. they differ by a power of $2^{N-1}$, where N is the number of bits representing a virtual address.

Under normal operation, the main application unit 12 accesses the first MMU entry I for data structure A, step N1. Upon translating the first virtual address VA1 21 into the first physical address PA1 23 the corresponding location in a physical memory 20 is further accessed according to the set access attributes 24, step N2. The physical memory 20 can be any means capable of storing data known in the art of computer systems.

When a data breakpoint is desired for the data structure A, the main application unit 12 accesses the second MMU entry II, step DB1. Since this entry has an interrupt triggering sub-entry 25, an interrupt is generated and control is passed from the main application unit 12 to a debugger 18, step DB2. The debugger 18 allows for debugging operations to be executed. Upon completion of debugging operation, control may be passed back to the main application unit 12, step DB3, for allowing the main application unit 12 to resume normal execution. Similarly to the main application unit 12 the debugger 18 can be any functional equivalent to a language construct, as obvious to someone skilled in the art, comprising one or more steps, and allowing for debugging operations to be carried out.

Resuming normal execution can take place in several ways. In one case, after data examination, the debugger 14 may adjust the main application unit 12 such as it accesses data structure A via the first MMU entry I and returns control to the main application unit 12 at the same instruction. Alternatively, after data examination, the debugger 14 can do the following:

i. change the interrupt triggering sub-entry 25 to match the corresponding entries in the first MMU entry I, i.e. to those corresponding to a normal execution flow;

ii. re-execute the instruction that triggered the debugger 18;

iii. reverse step i, i.e. provide the second MMU entry II with a new interrupt triggering sub-entry; and iv. return control to the main application unit 12.

According to the preferred embodiment, MMU entries correspond to a larger number of data structures, rather than just one, and they specify the start of virtual and physical address ranges and an offset, rather than actual addresses. Such entries correspond to an MMU page, with each page presenting the same set of attributes for all corresponding data structures, and the first and second MMU entries I, II are located within different pages and have different attributes.

Accessing MMU entries corresponding to data structures can be done by various methods known to someone skilled in the art. According to the preferred embodiment, these tasks are accomplished using pointers. A common concept in many programming languages, a pointer 'points' to a memory address. In other words, its value represents a memory address. Dereferencing a pointer means accessing the contents of the memory location specified by the pointer.

Using the system of FIG. 1, data breakpoints can be set for any number of data structures within the main application unit 12.

Figure 2:
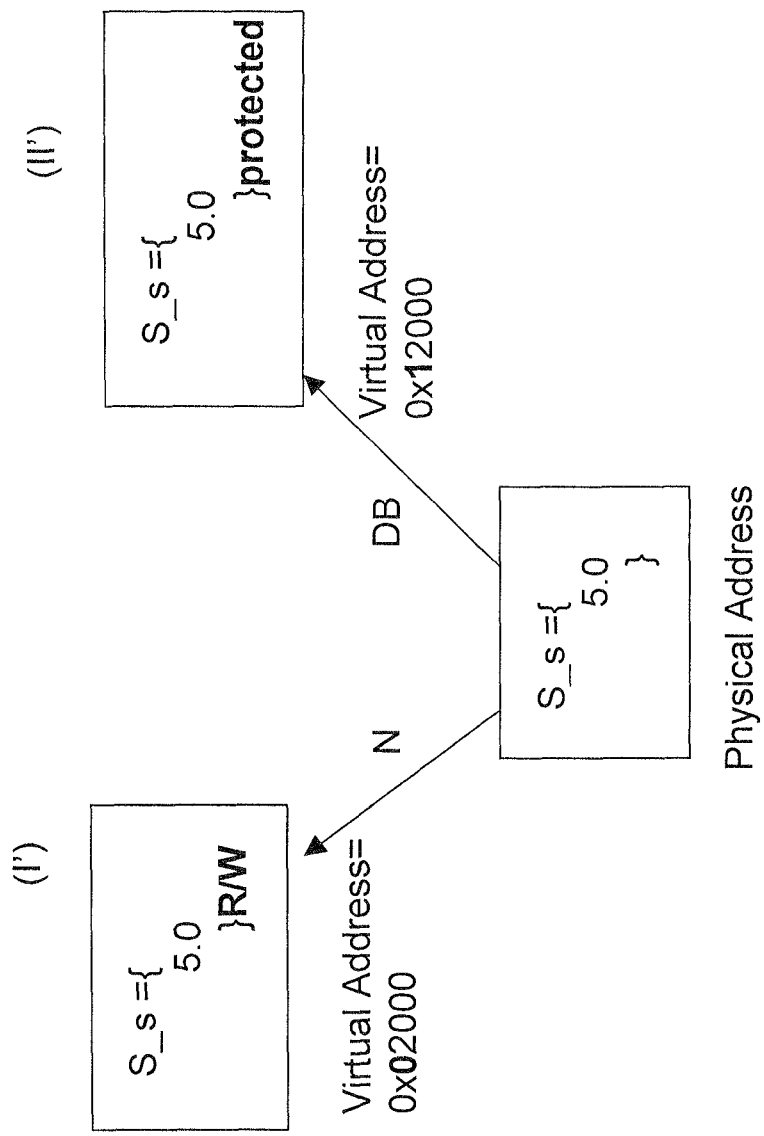
FIG. 2 illustrates a data structure setup in accordance with the preferred embodiment of the invention.

Referring now to FIG. 2, an example of a data structure setup according to the preferred embodiment of the invention is illustrated. According to this example, a main application unit contains a set of data structures that contain pointers. The pointers point to other data structures. The data structures are loaded into a contiguous range of memory.

For the normal operation of the main application program having data structure 's', a first MMU entry I' is created within the MMU. When a data breakpoint is desired for data structure 's', a second MMU entry II' is also created within the MMU. The second MMU entry II' points to the same block of physical memory as the first MMU entry I'. The second MMU entry II' is protected, being marked as no-access, thus causing an exception whenever virtual address in its range is accessed. In addition, the first and second MMU entries I', II', specify non-overlapping virtual addresses for data structure 's'. In this example, the two virtual addresses are offset by a power of 2, the first virtual address being 0x02000 and 0x12000, and the addresses differ only in bit 16.

For the normal operation of the system, without any breakpoints, bit 16 of a pointer to data structure 's' is set to 0, so that when the processor dereferences the pointer, it accesses the first MMU entry I' having virtual address 0x02000 with attribute R/W. No MMU exception occurs.

e.g. in 'C':

i. S*pointer_to_s=0x02000

When a data breakpoint is desired for 's', the pointer's bit 16 is flipped so that the pointer references the second MMU entry II' with no-access attribute. When the pointer is dereferenced, a page fault exception is caused. The program is suspended, and a debugger allows the user an opportunity to debug the system.

e.g. in 'C':

i. S*pointer_to_s=0x12000

To clear the data breakpoint, the pointer's bit 16 is reset to point back into the non-protected space.

With this method, many data structures can be packed into the same page. Setting a data breakpoint for a particular data structure using the present invention does not cause page fault for all data structures stored on the same MMU page.

An exemplary embodiment of the invention contemplates ability to set data breakpoints for program applications organized as state-machines. The state-machines can be described by data structures. Pointers may be used to reference data structures.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A data processing system comprising:
   a main application unit for executing a main application having at least one data structure;
   a memory management unit (MMU) comprising a plurality of first MMU entries for data structures within the main application, the plurality of first MMU entries having access attributes corresponding to a normal mode of execution of the main application; and
   a data breakpoint implementation system for allowing selection between the normal mode of execution and a debugging mode of execution associated with a selected data structure within the main application, said data breakpoint implementation system creating a first MMU entry and a second MMU entry corresponding to said selected data structure, the second MMU entry being distinct from the first MMU entry for the selected data structure, the second MMU entry having an interrupt triggering sub-entry, where the normal mode of execution is interrupted and the debugging mode of execution for the selected data structure is started upon accessing said second MMU entry.

2. The data processing system in claim 1, where the interrupt triggering sub-entry of said second MMU entry is an indicator that a physical address for the selected data structure does not exist.

3. The data processing system in claim 1, where the interrupt triggering sub-entry of said second MMU entry is a no-access attribute.

4. The data processing system in claim 1, wherein said first MMU entry has a first virtual address and said second MMU entry has a second virtual address, said first virtual address and said second virtual address differing in a predetermined manner.

5. The data processing system in claim 4, wherein said first virtual address and said second virtual address differ in the most significant bit.

6. The data processing system in claim 1, wherein said first MMU entry and said second MMU entry associate the same physical memory location with said selected data structure.

7. The data processing system in claim 1, further comprising a debugger, said debugger becoming operable in response to said main application unit accessing said second MMU entry.

8. The data processing system in claim 1, wherein MMU entries are accessed via pointers.

9. The data processing system of claim 1, wherein the application is organized as a state-machine.

10. The data processing system of claim 9, wherein said state-machine is described by data structures.

11. The data processing system of claim 10, wherein pointers are used to reference data structures.

12. The data processing system of claim 1, wherein access to the second MMU entry causes a page fault.

13. A method of providing a data breakpoint comprising:
    a data processing system having a memory management unit MMU;
    a selected data structure within a main application of said data processing system, wherein said main application having a normal mode of execution and a debugging mode of execution and said data breakpoint allowing selection of one of the normal mode of execution and the debugging mode of execution;

said data processing system creating a first distinct MMU entry associating a first virtual address and access attributes with said selected data structure, wherein said first MMU entry corresponding to the normal mode of execution; and said data processing system creating a second distinct MMU entry associating a second virtual address and an interrupt triggering sub-entry with said selected data structure, said second MMU entry corresponding to the debugging mode of execution, said second virtual address being distinct from said first virtual address, where the normal mode of execution is interrupted and the debugging mode of execution is triggered upon accessing said second MMU entry.

14. The method of claim 13, further comprising:

executing an instruction in the main application unit containing said selected data structure;

accessing said selected data structure through said second MMU entry for interrupting said main application;

passing control to a debugger to allow for debugging operations; and resuming normal execution.

15. The method of claim 14, wherein the step of resuming normal execution comprises adjusting said main application unit for accessing said selected data structure through said first MMU entry and returning control to the main application unit.

16. The method of claim 14, wherein the step of resuming normal execution comprises:

changing said interrupt triggering sub-entry within said second MMU entry for allowing access of a physical memory location based on access attributes;

re-executing said instruction;

changing said second MMU entry by providing a new interrupt triggering sub-entry; and return control to said main application unit.

17. The method of claim 13, wherein access to the second MMU entry causes a page fault.

18. A computer system supporting the provision of data breakpoints comprising:

a main application, said main application having a normal mode of execution and a debugging mode of execution, said data breakpoint allowing selection of one of the normal mode of execution and the debugging mode of execution;

a memory management unit (MMU); and a system for implementing a data breakpoint for a selected data structure within the main application, said system creating two distinct MMU entries corresponding to said selected data structure, a first MMU entry of said two distinct MMU entries having access attributes corresponding to the normal mode of execution and a second MMU entry of said two distinct MMU entries having an interrupt triggering sub-entry corresponding to the debugging mode of execution, respectively, where the normal mode of execution is interrupted and the debugging mode of execution is triggered upon accessing said second MMU entry.

19. The computer system of claim 18 further comprising a central processing unit.

20. The computer system of claim 18 further comprising an operating system.

21. The computer system of claim 18 further comprising a debugger.

* * * * *